United States Patent [19]
Deroover et al.

[11] Patent Number: 5,876,915
[45] Date of Patent: Mar. 2, 1999

[54] PHOTOTHERMOGRAPHIC RECORDING MATERIAL COMPRISING SENSITIZING DYES AND A RECORDING PROCESS THEREFOR

[75] Inventors: Geert Deroover, Kessel-Lo; Ivan Hoogmartens, Wilrijk; Hans Strijckers, Oudergem, all of Belgium

[73] Assignee: Agfa-Gevaert, Mortsel, Belgium

[21] Appl. No.: 889,481

[22] Filed: Jul. 8, 1997

Related U.S. Application Data

[60] Provisional application No. 60/027,500 Dec. 13, 1996.

[30] Foreign Application Priority Data

Jul. 24, 1996 [EP] European Pat. Off. ............... 96202108

[51] Int. Cl.⁶ ............................... G03C 1/498; G03C 1/20
[52] U.S. Cl. .......................... 430/619; 430/572; 430/584; 430/588; 430/944
[58] Field of Search .................................... 430/588, 584, 430/619, 944, 572

[56] References Cited

U.S. PATENT DOCUMENTS

| | | | |
|---|---|---|---|
| 5,223,389 | 6/1993 | Matsunaga et al. | 430/576 |
| 5,364,755 | 11/1994 | Miyamoto et al. | 430/584 |
| 5,422,234 | 6/1995 | Bauer et al. | 430/527 |
| 5,424,174 | 6/1995 | Motokazu et al. | 430/350 |
| 5,424,182 | 6/1995 | Marginean, Sr. et al. | 430/617 |
| 5,541,054 | 7/1996 | Miller et al. | 430/619 |

FOREIGN PATENT DOCUMENTS 0559228  9/1993  European Pat. Off. .

Primary Examiner—Thorl Chea
Attorney, Agent, or Firm—Baker & Botts, L.L.P.

[57] ABSTRACT

A photothermographic recording material comprising a support and a photo-addressable thermally developable element comprising a substantially light-insensitive organic silver salt, a reducing agent therefor in thermal working relationship therewith, photosensitive silver halide spectrally sensitized with a dye and in catalytic association with the substantially light-insensitive organic silver salt and a binder, characterized in that the dye is represented by formula (I):

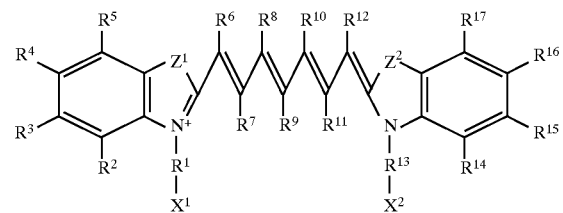

with an anion if necessary for charge compensation, wherein $Z^1$ and $Z^2$ independently represent S, O or Se; $R^1$ and $R^{13}$ independently represent an alkylene group; $X^1$ and $X^2$ independently represent a $-(C=O)-R^{18}$, a $-(SO_2)R^{19}$ or a $(S=O)-R^{20}$ group where $R^{18}$, $R^{19}$, and $R^{20}$ independently represent an alkoxy-, aryloxy-, amino- or substituted amino-group.

11 Claims, No Drawings

PHOTOTHERMOGRAPHIC RECORDING MATERIAL COMPRISING SENSITIZING DYES AND A RECORDING PROCESS THEREFOR

The application claims the benefit of U.S. Provisional application Ser. No. 60/027,500 filed Sep. 26, 1996.

DESCRIPTION

Field of the Invention

The present invention relates to a photothermographic recording material comprising photosensitive silver halide

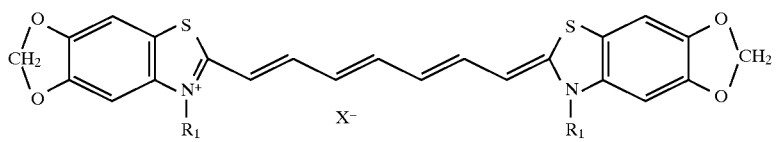

spectrally sensitized with specific dyes and a recording process therefor.

Background of the Invention

Thermal imaging or thermography is a recording process wherein images are generated by the use of imagewise modulated thermal energy.

In thermography three approaches are known:
1. Direct thermal formation of a visible image pattern by imagewise heating of a recording material containing matter that by chemical or physical process changes color or optical density.
2. Imagewise transfer of an ingredient necessary for the chemical or physical process bringing about changes in color or optical density to a receptor element.
3. Thermal dye transfer printing wherein a visible image pattern is formed by transfer of a coloured species from an imagewise heated donor element onto a receptor element.

Thermographic materials of type 1 become photothermographic when a photosensitive agent is present which after exposure to UV, visible or IR light is capable of catalyzing or participating in a thermographic process bringing about changes in color or optical density.

Examples of photothermographic materials are the so called "Dry Silver" photographic materials of the 3M Company, which are reviewed by D. A. Morgan in "Handbook of Imaging Science", edited by A. R. Diamond, page 43, published by Marcel Dekker in 1991.

The most widely used radiation-sensitive salt in such materials is silver halide, which must be present in catalytic association with the organic silver salt so that the species formed on exposure can catalyze the thermal image forming process. Silver halide requires spectral sensitization with dyes to extend its sensitivity range into the infra-red region of actinic radiation.

Different classes of benzoxazole, benzothiazole and benzoselenazole cyanine spectral sensitizers have been disclosed for use in infrared-sensitive photothermographic materials on the basis of organic silver salts/silver halide/reducing agent-systems: U.S. Pat. No. 4,835,096 discloses a photothermographic element characterised in that it contains as a sensitizer a dye of the general formula:

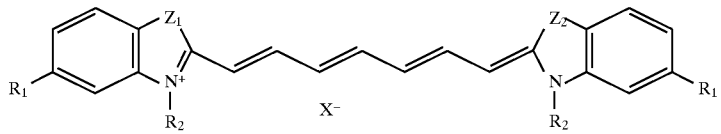

wherein $R_1$ represents a lower alkyl group of from 1 to 5 carbon atoms and $X^-$ represents an anion; JN03-163440A discloses a heat developing photosensitive element comprising at least one sensitizing dye of formula (I):

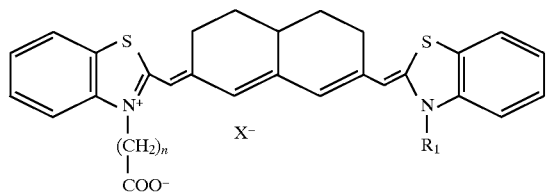

wherein $Z_1$ and $Z_2$ are each S, O or Se; $R_1$=H, alkyl, alkoxy; $R_2$=carboxyalkyl or —$(CH_2)_n$COOH; n=1 to 4; and X=Cl, Br or I; U.S. Pat. No. 5,441,866 discloses a heat-developable photothermographic element comprising a preferably hydrophobic binder, supersensitizer and a spectrally sensitizing amount of an infrared absorbing dye having the central nucleus:

wherein $R^1$ represents a $(CH_2)_n$—$COO^-$ group of from 1–20 carbon atoms, or an alkyl group of from 1 to 20 carbon atoms; and n is an integer from 1 to 20; and EP-A 616 014 discloses a heptamethine cyanine dye characterised in that both nitrogen atoms of the cyanine chromophore bear a 5 carboxyalkyl substituent comprising an alkyl chain of at least five carbon atoms, which may be used in conjunction with supersensitizers such as 2-mercaptobenzimidazoles, metal chelating agents and pyridine, pyrimidine and triazine derivatives.

All these IR-spectral sensitizers require the presence of a supersensitizer in concentrations of between 3 and 50 moles/mole spectral sensitizer to exhibit acceptable spectral sensitization of photosensitive silver halide. The presence of an extra ingredient in such large quantities is disadvantageous both from an economic standpoint and from the danger of interference with functional ingredients.

OBJECTS OF THE INVENTION

It is a first object of the invention to provide a photothermographic recording material with a high infra-red sensitivity and excellent image-forming properties.

It is a second object of the invention to provide a photothermographic recording material comprising a photo-addressable thermally developable element based on a substantially light-insensitive organic silver salt, an organic reducing agent for the organic silver salt and photosensitive silver halide in catalytic association with the light insensitive organic silver salt spectrally sensitized with a dye which does not require the presence of a supersensitizer to exhibit strong spectral sensitization.

It is a third object of the invention to provide a photo-addressable thermally developable element with excellent image-forming properties, which can be coated from aqueous media.

It is a yet a still further object of the invention to provide a recording process for a photothermographic recording material with the above improved characteristics.

Further objects and advantages of the invention will become apparent from the description hereinafter.

SUMMARY OF THE INVENTION

According to the present invention, a photothermographic material is provided comprising a photo-addressable thermally developable element containing a substantially light-insensitive organic silver salt, a reducing agent therefor in thermal working relationship therewith, photosensitive silver halide spectrally sensitized with a dye and in catalytic association with the substantially light-insensitive organic silver salt and a binder, wherein the dye is represented by the formula (I):

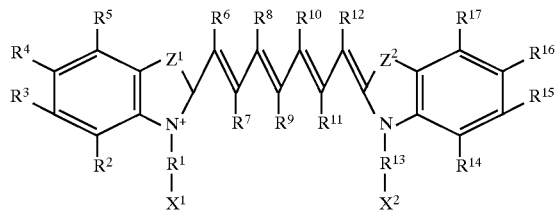

with an anion if necessary for charge compensation, wherein $Z^1$ and $Z^2$ independently represent S, O or Se; $R^1$ and $R^{13}$ independently represent an alkylene group; $X^1$ and $X^2$ independently represent a —(C=O)—$R^{18}$, a —($SO_2$)—$R^{19}$ or a —(S=O)—$R^{20}$ group where $R^{18}$, $R^{19}$ and $R^{20}$ independently represent an alkoxy-, aryloxy- or amino-group; $R^2$, $R^3$, $R^4$, $R^5$, $R^{14}$, $R^{15}$, $R^{16}$ and $R^{17}$ independently represent hydrogen, chlorine, bromine, fluorine, iodine or a keto-, sulfo-, carboxy-, ester-, sulfonamide-, amide-, dialkylamino-, nitro-, cyano-, alkyl-, alkenyl-, heteroaromatic, aryl-, alkoxy- or aryloxy-group; or each of $R^2$ together with $R^3$, $R^3$ together with $R^4$, $R^4$ together with $R^5$, $R^{14}$ together with $R^{15}$, $R^{15}$ together with $R^{16}$ and $R^{16}$ together with $R^{17}$ may independently constitute the atoms necessary to complete a benzene ring; $R^6$, $R^7$, $R^8$, $R9$, $R^{10}$, $R^{11}$ and $R^{12}$ independently represent hydrogen, chlorine, bromine, fluorine, iodine, an alkyl group, an alkoxy group, an aryloxy group, a thioalkyl group, a disubstituted amino group, where the substituents may constitute the atoms necessary to complete a 5-ring atom or 6-ring atom heterocyclic ring, or each of $R^6$ together with $R^8$, $R^8$ together with $R^{10}$, $R^{10}$ together with $R^{12}$, $R^7$ together with $R^9$ and $R^9$ together with $R^{11}$ may independently constitute the atoms necessary to complete a 5-atom or 6-atom carbocyclic or heterocyclic ring; and each of $R^1$ together with $R^6$ and $R^{13}$ together with $R^{12}$ may independently constitute the atoms necessary to complete a 5-ring atom or 6-ring atom heterocyclic ring.

Preferred embodiments of the invention are disclosed in the dependent claims.

DETAILED DESCRIPTION OF THE INVENTION

IR-Spectrally Sensitizing Dyes

According to the present invention the photo-addressable thermally developable element comprises a dye represented by the formula (I) in which the $R^{18}$, $R^{19}$ and $R^{20}$ groups represent a substituted amino group i.e. all possible substitutions of the amino group. including thereby, —NH—(C=O)—$R^{21}$, —NH—($SO_2$)—$R^{22}$, —NH—(S=O)—$R^{23}$, —$N^-$—CN, —$N^-$—(C=O)—$R^{24}$, —$N^-$—($SO_2$)—$R^{25}$, —$N^-$—(S=O)—$R^{26}$ and —$N^-$—CN groups where $R^{21}$, $R^{22}$, $R^{23}$, $R^{24}$, $R^{25}$ and $R^{26}$ independently represent an alkyl or aryl group. In a preferred embodiment of the present invention the dye is represented by the formula (I) wherein $R^{18}$, $R^{19}$ and $R^{20}$ independently represent a —NH—(C=O)—$R^{21}$, —NH—($SO_2$)—$R^{22}$, —NH—(S=O)—$R^{23}$ or a —NH—CN group which may be deprotonated, where $R^{21}$, $R^{22}$ and $R^{23}$ independently represent an alkyl or aryl group.

All the above-defined substituents and carbocyclic and heterocyclic rings in formula (I) may also be substituted.

In a further preferred embodiment of the present invention the dye is present as an amine salt.

In a particularly preferred embodiment of the present invention the dye is represented by the formula

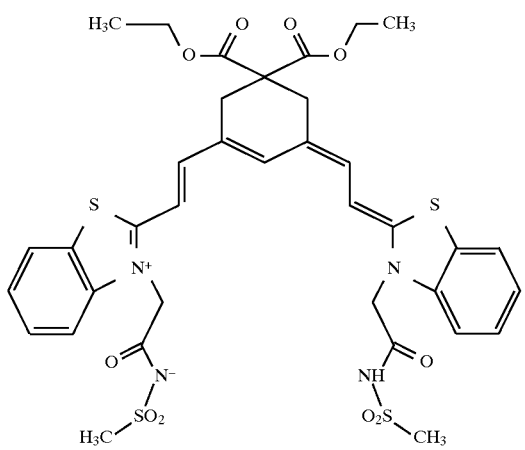

In a further particularly preferred embodiment of the present invention the dye is represented by the formula

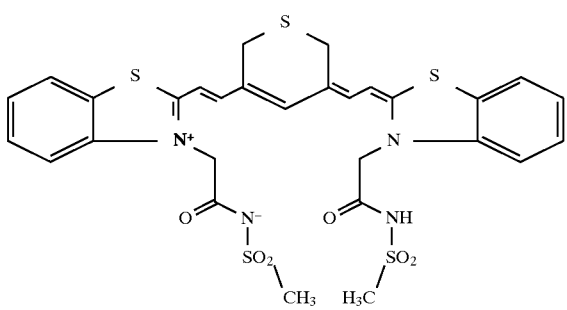
In a still further particularly preferred embodiment of the present invention the dye is represented by the formula
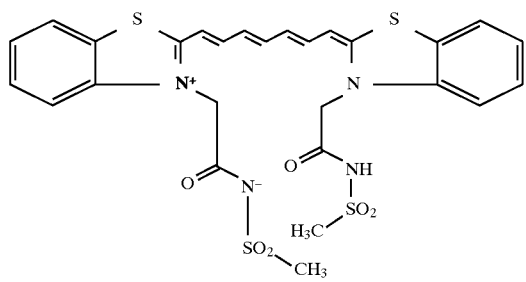
In a yet further particularly preferred embodiment of the present invention the dye is represented by the formula
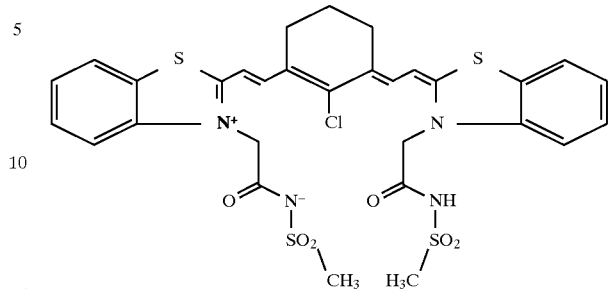
Suitable IR-sensitizing dyes according to the present invention are:
SENSI 01:
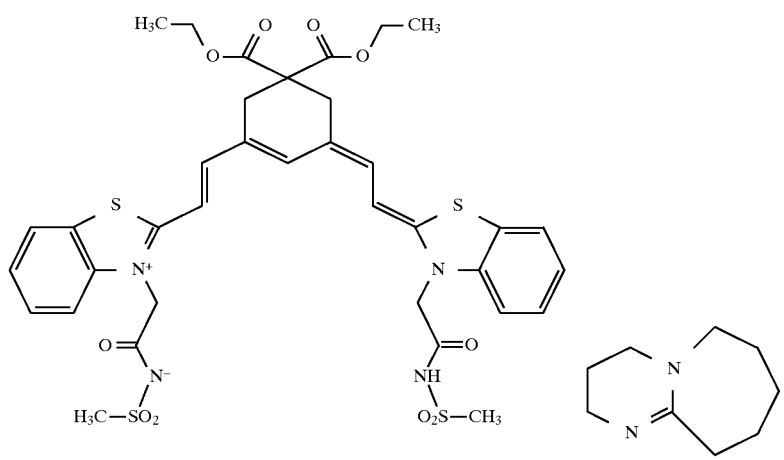
SENSI 02:
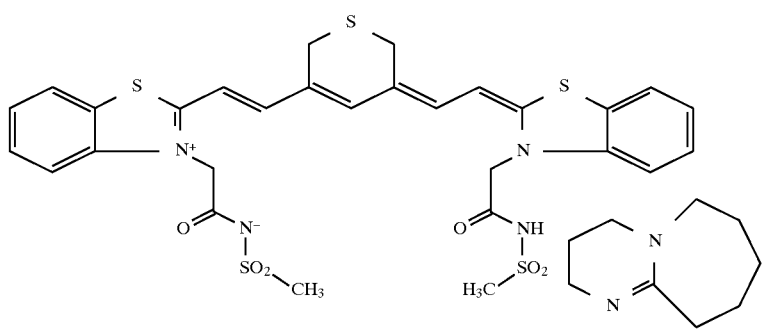

SENSI 03:
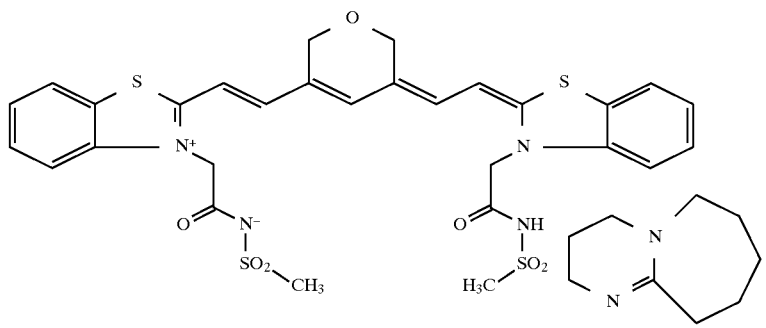
SENSI 04:
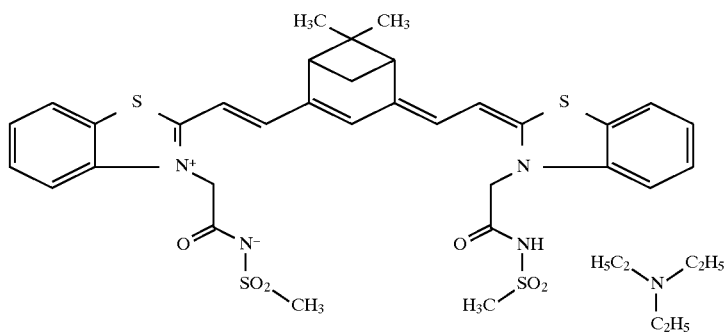
SENSI 05:
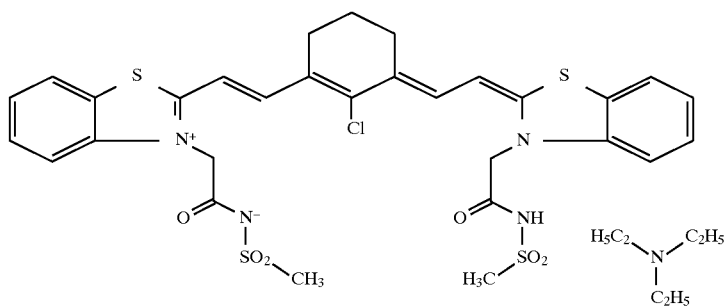
SENSI 06:
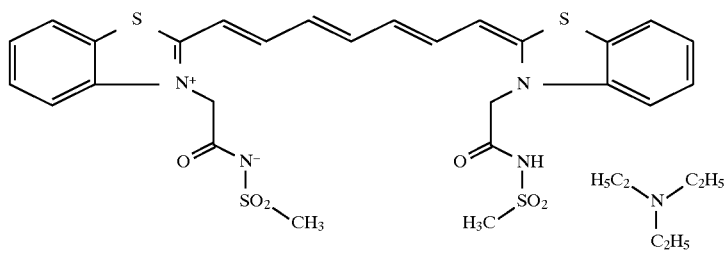

SENSI 07:
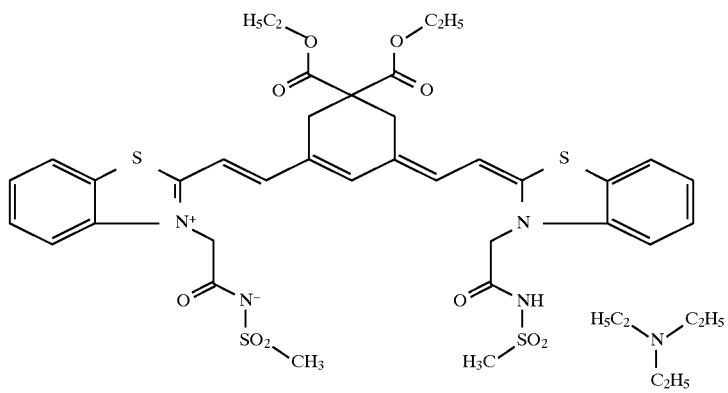
SENSI 08:
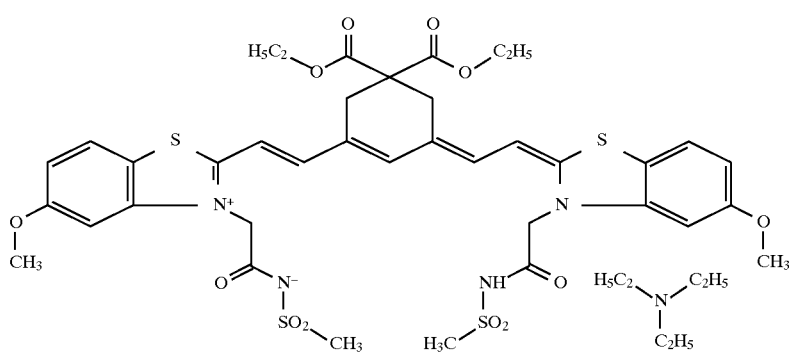
SENSI 09:
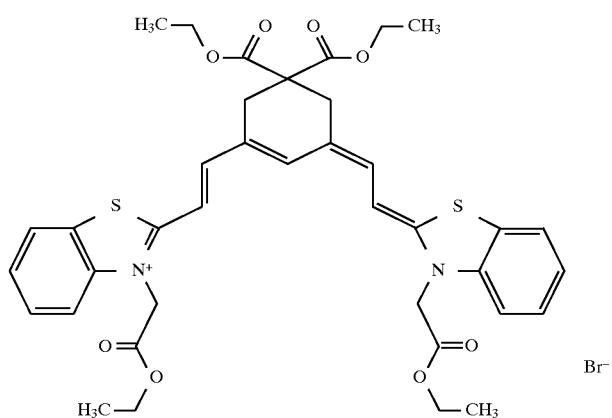
SENSI 10:
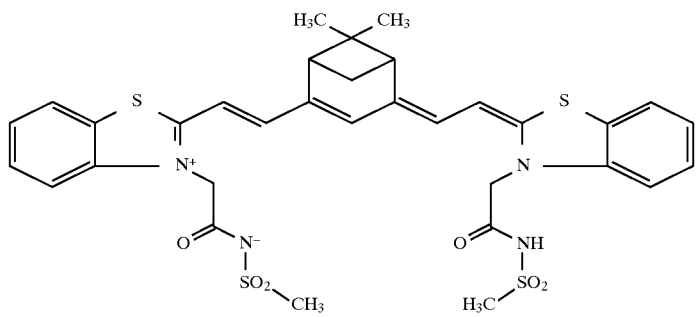

SENSI 11:

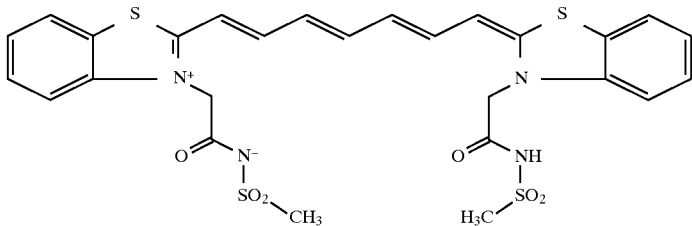

-continued

SENSI 01 was synthesized as described in INVENTION EXAMPLE 1. Similar synthetic techniques to those described in INVENTION EXAMPLE 1 and those described in F. M. Hamer, "The Cyanine Dyes and Related Compounds", Interscience Publishers, New York (1964) can be used to synthesize other IR-sensitizing dyes used according to the present invention.

The sensitivity of the photothermographic recording materials comprising IR-sensitizing dyes used according to the present invention will depend upon the choice of IR-sensitizing dye, the concentration thereof, the way in which the IR-sensitizing dye is incorporated and the exact composition of the photothermographic recording material.

The term infra-red light for the purposes of the present invention means light with a wavelength in the range from 700 nm to 1000 μm.

Supersensitizer

According to a preferred embodiment of the present invention the photo-addressable element further includes a supersensitizer. In a particularly preferred embodiment of the present invention the supersensitizer is selected from the group of compounds consisting of: mercapto-compounds, disulfide-compounds, stilbene compounds, organoborate compounds and styryl compounds.

The choice of supersensitizer and molar ratio of supersensitizer to IR-sensitizing dye is dependent upon the choice of IR-sensitizing dye and the medium from which the layer of the photo-addressable thermally developable element is coated. Suitable supersensitizers for use according to the present invention are:

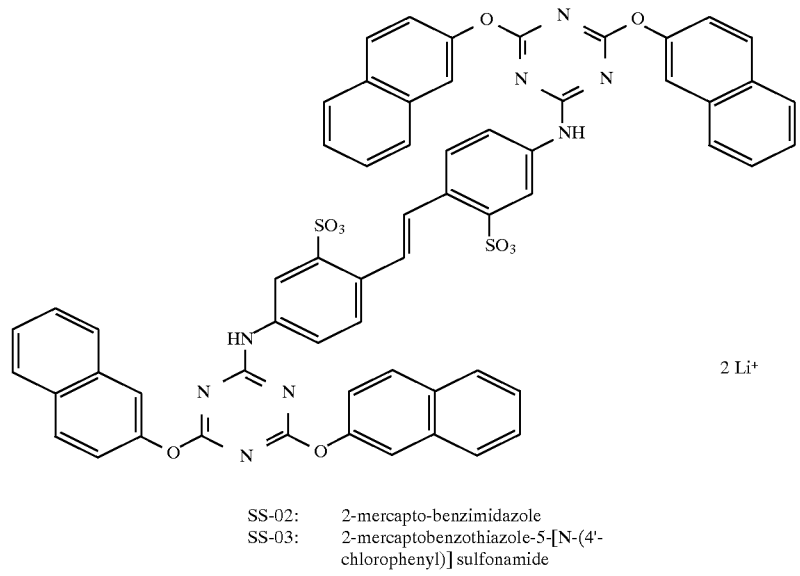

SS-02: 2-mercapto-benzimidazole
SS-03: 2-mercaptobenzothiazole-5-[N-(4'-chlorophenyl)] sulfonamide The molar ratio of supersensitizer to IR-sensitizing dye used according to the present invention will depend upon the desired improvement in photothermographic performance e.g. increased sensitivity, reduced $D_{min}$ etc.

Photo-Addressable Thermally Developable Element

The photo-addressable thermally developable element, according to the present invention, comprises a substantially light-insensitive organic silver salt, photosensitive silver halide in catalytic association therewith and an organic reducing agent in thermal working relationship with the substantially light-insensitive organic silver salt and a binder. The element may comprise a layer system with the silver halide in catalytic association with the substantially light-insensitive organic silver salt, spectral sensitizer optionally together with a supersensitizer in sensitizing association with the silver halide particles and the other ingredients active in the thermal development process or pre- or post-development stabilization of the element being in the same layer or in other layers with the proviso that the organic reducing agent and the toning agent, if present, are in thermal working relationship with the substantially light-insensitive organic silver salt i.e. during the thermal development process the reducing agent and the toning agent, if present, are able to diffuse to the substantially light-insensitive organic silver salt.

Substantially Light-Insensitive Organic Silver Salts

Preferred substantially light-insensitive organic silver salts according to the present invention are silver salts of organic carboxylic acids in particular aliphatic carboxylic acids known as fatty acids, wherein the aliphatic carbon chain has preferably at least 12 C-atoms, e.g. silver laurate, silver palmitate, silver stearate, silver hydroxystearate, silver oleate and silver behenate, which silver salts are also called "silver soaps"; silver dodecyl sulphonate described in U.S. Pat. No. 4,504,575; and silver di-(2-ethylhexyl)-sulfosuccinate described in EP-A 227 141. Modified aliphatic carboxylic acids with thioether group as described e.g. in GB-P 1,111,492 and other organic silver salts as described in GB-P 1,439,478, e.g. silver benzoate and silver phthalazinone, may be used likewise to produce a thermally developable silver image. Further are mentioned silver imidazolates and the substantially light-insensitive inorganic or organic silver salt complexes described in U.S. Pat. No. 4,260,677.

The term substantially light-insensitive organic silver salt for the purposes of the present invention also includes mixtures of organic silver salts.

Photosensitive Silver Halide

The photosensitive silver halide used in the present invention may be employed in a range of 0.1 to 35 mol percent of substantially light-insensitive organic silver salt, with the range from 0.5 to 20 mol percent being preferred and the range from 1 to 12 mol percent being particularly preferred.

The silver halide may be any photosensitive silver halide such as silver bromide, silver iodide, silver chloride, silver bromoiodide, silver chlorobromoiodide, silver chlorobromide etc. The silver halide may be in any form which is photosensitive including, but not limited to, cubic, orthorhombic, tabular, tetrahedral, octagonal etc. and may have epitaxial growth of crystals thereon.

The silver halide used in the present invention may be employed without modification. However, it may be chemically sensitized with a chemical sensitizing agent such as a compound containing sulphur, selenium, tellurium etc., or a compound containing gold, platinum, palladium, iron, ruthenium, rhodium or iridium etc., a reducing agent such as a tin halide etc., or a combination thereof. The details of these procedures are described in T. H. James, "The Theory of the Photographic Process", Fourth Edition, Macmillan Publishing Co. Inc., New York (1977). Chapter 5, pages 149 to 169.

Emulsion of Organic Silver Salt and Photosensitive Silver Halide

A suspension of particles containing a substantially light-insensitive silver salt of an organic carboxylic acid may be obtained by using a process, comprising simultaneous metered addition of an aqueous solution or suspension of an organic carboxylic acid or its salt; and an aqueous solution of a silver salt to an aqueous liquid, as described in EP-A 754 969

The silver halide may be added to the photo-addressable thermally developable element in any fashion which places it in catalytic proximity to the substantially light-insensitive organic silver salt. Silver halide and the substantially light-insensitive organic silver salt which are separately formed, i.e. ex-situ or "preformed", in a binder can be mixed prior to use to prepare a coating solution, but it is also effective to blend both of them for a long period of time. Furthermore, it is effective to use a process which comprises adding a halogen-containing compound to the organic silver salt to partially convert the substantially light-insensitive organic silver salt to silver halide as disclosed in U.S. Pat. No. 3,457,075.

A particularly preferred mode of preparing the emulsion of organic silver salt and photosensitive silver halide for coating of the photo-addressable thermally developable element from solvent media, according to the present invention is that disclosed in U.S. Pat. No. 3,839,049, but other methods such as those described in Research Disclosure, June 1978, item 17029 and U.S. Pat. No. 3,700,458 may also be used for producing the emulsion.

A particularly preferred mode of preparing the emulsion of organic silver salt and photosensitive silver halide for coating of the photo-addressable thermally developable element from aqueous media, according to the present invention is that disclosed in unpublished PCT patent application PCT/EP/96/02580, which discloses a photothermographic recording material comprising a photo-addressable thermally developable element comprising a substantially light-insensitive organic silver salt, photosensitive silver halide in catalytic association with the substantially light-insensitive organic silver salt, a reducing agent in thermal working relationship with the substantially light-insensitive organic silver salt and a binder, characterized in that the binder comprises a water-soluble polymer, a water-dispersible polymer or a mixture of a water-soluble polymer and a water-dispersible polymer and particles of the photosensitive silver halide are non-aggregating in the photo-addressable thermally developable element and are uniformly distributed over and between particles of the substantially light-insensitive organic silver salt, at least 80% by number of the particles having a diameter, determined by transmission electron microscopy, of $\leq 40$ nm.

Organic Reducing Agent for Photo-Addressable Thermally Developable Elements Coated from Non-Aqueous Media Suitable organic reducing agents for the reduction of the substantially light-insensitive organic heavy metal salts in photo-addressable thermally developable coated from non-aqueous media are organic compounds containing at least one active hydrogen atom linked to O, N or C, such as is the case with, mono-, bis-, tris- or tetrakis-phenols; mono- or bis-naphthols; di- or polyhydroxynaphthalenes; di- or polyhydroxybenzenes; hydroxymonoethers such as alkoxynaphthols, e.g. 4-methoxy-1-naphthol described in U.S. Pat. No. 3,094,41; pyrazolidin-3-one type reducing agents, e.g. PHENIDONE (tradename); pyrazolin-5-ones; indan-1,3-dione derivatives; hydroxytetrone acids; hydroxytetronimides; 3-pyrazolines; pyrazolones; reducing saccharides; aminophenols e.g. METOL (tradename); p-phenylenediamines, hydroxylamine derivatives such as for example described in U.S. Pat. No. 4,082,901: reductones e.g. ascorbic acids; hydroxamic acids; hydrazine derivatives; amidoximes; n-hydroxyureas; and the like, see also U.S. Pat. Nos. 3,074,809, 3,080,254, 3,094,417 and 3,887,378.

Polyphenols such as the bisphenols used in the 3M Dry Silver™ materials, sulfonamide phenols such as used in the Kodak Dacomatic™ materials, and naphthols are particularly preferred for photothermographic recording materials with photo-addressable thermally developable elements on the basis of photosensitive silver halide/organic silver salt/reducing agent.

Organic Reducing Agent for Photo-Addressable Thermally Developable Elements Coated from Aqueous Media Suitable organic reducing agents for the reduction of the substantially light-insensitive organic heavy metal salts in photo-addressable thermally developable coated from aqueous media are organic compounds containing at least one active hydrogen atom linked to O, N or C. Particularly suitable organic reducing agents for the reduction of the substantially light-insensitive organic silver salt in such photo-addressable thermally developable elements are non-sulfo-substituted 6-membered aromatic or heteroaromatic ring compounds with at least three substituents one of which is a hydroxy group at a first carbon atom and a second of which is a hydroxy or amino-group substituted on a second carbon atom one, three or five ring atoms removed in a system of conjugated double bonds from the first carbon atom in the compound, in which (i) the third substituent may be part of an annelated carbocyclic or heterocyclic ring system; (ii) the third substituent or a further substituent is not an aryl- or o|o-aryl-group whose aryl group is substituted with hydroxy-, thiol- or amino-groups; and (iii) the third substituent or a further substituent is a non-sulfo-electron withdrawing group if the second substiuent is an amino-group.

Particularly preferred reducing agents are substituted catechols or substituted hydroquinones with 3-(3',4'-dihydroxyphenyl)-propionic acid, 3',4'-dihydroxy-butyrophenone, methyl gallate, ethyl gallate and 1,5-dihydroxy-naphthalene being especially preferred.

Reducing Agent Incorporation

During the thermal development process the reducing agent must be present in such a way that it is able to diffuse to the substantially light-insensitive organic silver salt particles so that reduction of the organic silver salt can take place.

Auxiliary Reducing Agents

The above mentioned reducing agents, regarded as primary or main reducing agents, may be used in conjunction with so-called auxiliary reducing agents. Auxiliary reducing agents that may be used in conjunction with the above mentioned primary reducing agents are sulfonyl hydrazide reducing agents such as disclosed in U.S. Pat. No. 5,464,738, trityl hydrazides and formyl-phenyl-hydrazides such as disclosed in U.S. Pat. No. 5,496,695 and organic reducing metal salts, e.g. stannous stearate described in U.S. Pat. Nos. 3,460,946 and 3,547,648.

Binder

The film-forming binder for the photo-addressable thermally developable element according to the present invention may be coatable from a solvent or aqueous dispersion medium.

The film-forming binder for the photo-addressable thermally developable element according to the present invention may be coatable from a solvent dispersion medium, according to the present invention, may be all kinds of natural, modified natural or synthetic resins or mixtures of such resins, wherein the organic silver salt can be dispersed homogeneously: e.g. polymers derived from α,β-ethylenically unsaturated compounds such as polyvinyl chloride, after-chlorinated polyvinyl chloride, copolymers of vinyl chloride and vinylidene chloride, copolymers of vinyl chloride and vinyl acetate, polyvinyl acetate and partially hydrolyzed polyvinyl acetate, polyvinyl acetals that are made from polyvinyl alcohol as starting material in which only a part of the repeating vinyl alcohol units may have reacted with an aldehyde, preferably polyvinyl butyral, copolymers of acrylonitrile and acrylamide, polyacrylic acid esters, polymethacrylic acid esters, polystyrene and polyethylene or mixtures thereof. A particularly suitable polyvinyl butyral containing a minor amount of vinyl alcohol units is marketed by MONSANTO USA under the trade names BUTVAR™ B76 and BUTVAR™ B79 and provides a good adhesion to paper and properly subbed polyester supports.

The film-forming binder for the photo-addressable thermally developable element coatable from an aqueous dispersion medium, according to the present invention, may be all kinds of transparent or translucent water-dispersible or water soluble natural, modified natural or synthetic resins or mixtures of such resins, wherein the organic silver salt can be dispersed homogeneously for example proteins, such as gelatin and gelatin derivatives (e.g. phthaloyl gelatin), cellulose derivatives, such as carboxymethylcellulose, polysaccharides, such as dextran, starch ethers etc., galactomannan, polyvinyl alcohol, polyvinylpyrrolidone, acrylamide polymers, homo- or co-polymerized acrylic or methacrylic acid, latexes of water dispersible polymers, with or without hydrophilic groups, or mixtures thereof. Polymers with hydrophilic functionality for forming an aqueous polymer dispersion (latex) are described e.g. in U.S. Pat. No. 5,006,451, but serve therein for forming a barrier layer preventing unwanted diffusion of vanadium pentoxide present as an antistatic agent.

Weight Ratio of Binder to Organic Silver Salt

The binder to organic heavy metal salt weight ratio is preferably in the range of 0.2 to 6, and the thickness of the photo-addressable thermally developable element is preferably in the range of 5 to 50 μm.

Thermal Solvents

The above mentioned binders or mixtures thereof may be used in conjunction with waxes or "heat solvents" also called "thermal solvents" or "thermosolvents" improving the reaction speed of the redox-reaction at elevated temperature.

By the term "heat solvent" in this invention is meant a non-hydrolyzable organic material which is in solid state in the recording layer at temperatures below 50° C. but becomes a plasticizer for the recording layer in the heated region and/or liquid solvent for at least one of the redox-reactants, e.g. the reducing agent for the organic heavy metal salt, at a temperature above 60° C.

Toning Agent

In order to obtain a neutral black image tone in the higher densities and neutral grey in the lower densities the photo-addressable thermally developable element contains preferably in admixture with the organic heavy metal salts and reducing agents a so-called toning agent known from thermography or photothermography.

Suitable toning agents are succinimide and the phthalimides and phthalazinones within the scope of the general formulae described in U.S. Pat. No. 4,082,901. Further reference is made to the toning agents described in U.S. Pat. Nos. 3,074,809, 3,446,648 and 3,844,797. Other particularly useful toning agents are the heterocyclic toner compounds of the benzoxazine dione or naphthoxazine dione type as described in GB-P 1,439,478 and U.S. Pat. No. 3,951,660.

Stabilizers and Antifoggants

In order to obtain improved shelf-life and reduced fogging, stabilizers and antifoggants may be incorporated into the photothermographic materials of the present invention. Examples of suitable stabilizers and antifoggants and their precursors, which can be used alone or in combination, include the thiazolium salts described in U.S. Pat. Nos. 2,131,038 and 2,694,716; the azaindenes described in U.S. Pat. Nos. 2,886,437 and 2,444,605; the urazoles described in U.S. Pat. No. 3,287,135; the sulfocatechols described in U.S. Pat. No. 3,235,652; the oximes described in GB-P 623,448; the thiuronium salts described in U.S. Pat. No. 3,220,839; the palladium, platinum and gold salts described in U.S. Pat. Nos. 2,566,263 and 2,597,915; the tetrazolyl-thio-compounds described in U.S. Pat. No. 3,700,457; the mesoionic 1,2,4-triazolium-3-thiolate stabilizer precursors described in U.S. Pat. Nos. 4,404,390 and 4,351,896; the tribromomethyl ketone compounds described in EP-A 600 587; the combination of isocyanate and halogenated compounds described in EP-A 600 586; the vinyl sulfone and β-halo sulfone compounds described in EP-A 600 589; and those compounds mentioned in this context in Chapter 9 of "Imaging Processes and Materials, Neblette's 8th edition", by D. Kloosterboer, edited by J. Sturge, V. Walworth and A. Shepp, page 279, Van Nostrand (1989); in Research Disclosure 17029 published in June 1978; and in the references cited in all these documents.

Surfactants

Non-ionic, cationic or anionic surfactants may be used, according to the present invention, to produce dispersions of particles of the substantially light-insensitive organic silver salt in aqueous media and to disperse water-dispersible binders, such as polymer latexes, in aqueous media. A mixture of non-ionic and anionic surfactacts, of non-ionic and cationic surfactants, of cationic and anionic surfactants or of non-ionic, cationic and anionic surfactants may also be used, according to the present invention.

In one embodiment of the present invention the surfactant is an anionic surfactant. In a preferred embodiment of the present invention the anionic surfactant is a sulfonate e.g. alkyl, aryl, alkaryl or aralkyl sulfonate, with alkyl and alkaryl sulfonates being particularly preferred e.g.:

MERSOLAT™ H, a sodium salt of an alkyl sulfonate from BAYER

ULTRAVON™ W, a sodium salt of an aryl sulfonate from CIBA-GEIGY

In a further embodiment of the present invention the ionic surfactant is a non-ionic surfactant for example alkyl, aryl, alkaryl or aralkyl polyethoxy ethanols. Preferred non-ionic surfactants, according to the present invention, are alkoxy-polyethoxy ethanols and alkaryloxy-polyethoxy ethanols.

Other Additives

In addition to the ingredients the photo-addressable thermally developable element may contain other additives such as free fatty acids, surface-active agents, antistatic agents, e.g. non-ionic antistatic agents including a fluorocarbon group as e.g. in $F_3C(CF_2)_6CONH(CH_2CH_2O)$—H, silicone oil, e.g. BAYSILONE 01 A (tradename of BAYER AG—GERMANY), ultraviolet light absorbing compounds, white light reflecting and/or ultraviolet radiation reflecting pigments. silica, colloidal silica, fine polymeric particles [e.g. of poly(methylmethacrylate)] and/or optical brightening agents.

Antihalation Dyes

According to a preferred embodiment of the present invention, the photothermographic recording material further comprises an antihalation or acutance dye which absorbs light which has passed through the photosensitive layer, thereby preventing its reflection. Such dyes may be incorporated into the photo-addressable thermally developable element or in any other layer comprising the photothermographic recording material of the present invention. The antihalation dye may also be bleached either thermally during the thermal development process or photo-bleached after removable after the thermal development process and it may be contained in a layer which can be removed subsequent to the exposure process. Suitable antihalation dyes for use with infra-red light are described in the EP-A's 377 961 and 652 473, the EP-B's 101 646 and 102 781 and the U.S. Pat. Nos. 4,581,325 and 5,380,635.

Support

The support for the photothermographic recording material according to the present invention may be transparent, translucent or opaque, e.g. having a white light reflecting aspect and is preferably a thin flexible carrier made e.g. from paper, polyethylene coated paper or transparent resin film, e.g. made of a cellulose ester, e.g. cellulose triacetate, corona and flame treated polypropylene, polystyrene, polymethacrylic acid ester, polycarbonate or polyester, e.g. polyethylene terephthalate or polyethylene naphthalate as disclosed in GB 1,293,676, GB 1,441,304 and GB 1,454,956. For example, a paper base substrate is present which may contain white reflecting pigments, optionally also applied in an interlayer between the recording material and the paper base substrate.

The support may be in sheet, ribbon or web form and subbed if need be to improve the adherence to the thereon coated thermosensitive recording layer. The support may be made of an opacified resin composition, e.g. polyethylene terephthalate opacified by means of pigments and/or microvoids and/or coated with an opaque pigment-binder layer, and may be called synthetic paper, or paperlike film; information about such supports can be found in EP's 194 106 and 234 563 and U.S. Pat. Nos. 3,944,699, 4,187,113, 4,780,402 and 5,059,579. Should a transparent base be used, the base may be colorless or coloured, e.g. having a blue color.

One or more backing layers may be provided to control physical properties such as curl or static.

Protective Layer

According to a preferred embodiment of the photothermographic recording material of the present invention, the photo-addressable thermally developable element is provided with a protective layer to avoid local deformation of the photo-addressable thermally developable element, to improve its resistance against abrasion and to prevent its direct contact with components of the apparatus used for thermal development.

This protective layer may have the same composition as an anti-sticking coating or slipping layer which is applied in thermal dye transfer materials at the rear side of the dye donor material or protective layers used in materials for direct thermal recording.

The protective layer preferably comprises a binder, which may be solvent soluble (hydrophobic), solvent dispersible, water soluble (hydrophilic) or water dispersible. Among the hydrophobic binders cellulose acetate butyrate, polymethylmethacrylate and polycarbonates, for example as described in EP-A 614 769, are particularly preferred. Suitable hydrophilic binders are, for example, gelatin, polyvinylalcohol, cellulose derivatives or other polysaccharides, hydroxyethylcellulose, hydroxypropylcellulose etc., with hardenable binders being preferred and polyvinylalcohol being particularly preferred.

A protective layer of the photothermographic recording material, according to the present invention, may be crosslinked. Crosslinking can be achieved by using crosslinking agents such as described in WO 95/12495 for protective layers, e.g. tetra-alkoxysilanes, polyisocyanates, zirconates, titanates, melamine resins etc., with tetraalkoxysilanes such as tetramethylorthosilicate and tetraethylorthosilicate being preferred.

A protective layer according to the present invention may comprise in addition at least one solid lubricant having a melting point below 150° C. and at least one liquid lubricant in a binder, wherein at least one of the lubricants is a phosphoric acid derivative, further dissolved lubricating material and/or particulate material, e.g. talc particles, optionally protruding from the outermost layer. Examples of suitable lubricating materials are surface active agents, liquid lubricants, solid lubricants which do not melt during thermal development of the recording material, solid lubricants which melt (thermomeltable) during thermal development of the recording material or mixtures thereof. The lubricant may be applied with or without a polymeric binder.

Such protective layers may also comprise particulate material, e.g. talc particles, optionally protruding from the protective outermost layer as described in WO 94/11198. Other additives can also be incorporated in the protective layer e.g. colloidal particles such as colloidal silica.

Antistatic Layer

In a preferred embodiment the recording material of the present invention an antistatic layer is applied to the outermost layer on the side of the support not coated with the photo-addressable thermally developable element. Suitable antistatic layers therefor are described in EP-A's 444 326, 534 006 and 644 456, U.S. Pat. Nos. 5,364,752 and 5,472, 832 and DOS 4125758.

Coating

The coating of any layer of the photothermographic recording material of the present invention may proceed by any coating technique e.g. such as described in Modern Coating and Drying Technology, edited by Edward D. Cohen and Edgar B. Gutoff, (1992) VCH Publishers Inc. 220 East 23rd Street, Suite 909 New York, N.Y. 10010, U.S.A.

Photothermographic Recording Process

Photothermographic materials, according to the present invention, may be exposed with infrared radiation at wavelenghts between 700 and 1100 nm with the image either being obtained by pixel-wise exposure with a finely focussed light source, such as an IR wavelength laser or an IR-laser diode, e.g. emitting at 780 nm, 830 nm or 850 nm; by direct exposure to the object itself or an image therefrom with IR light.

For the thermal development of image-wise exposed photothermographic recording materials, according to the present invention, any sort of heat source can be used that enables the recording materials to be uniformly heated to the development temperature in a time acceptable for the application concerned e.g. contact heating, radiative heating, microwave heating etc.

According to the present invention a photothermographic recording process is also provided comprising the steps of: (i) image-wise exposing a photothermographic recording material, as referred to above, with actinic radiation to which the photothermographic recording material is sensitive; and (ii) thermally developing the image-wise exposed photothermographic recording material.

Applications

The photothermographic recording materials of the present invention can be used for both the production of transparencies and reflection type prints. This means that the support will be transparent or opaque, e.g. having a white light reflecting aspect. For example, a paper base substrate is present which may contain white reflecting pigments, optionally also applied in an interlayer between the recording material and the paper base substrate. Should a transparent base be used, the base may be colorless or coloured, e.g. has a blue color.

In the hard copy field photothermographic recording materials on a white opaque base are used, whereas in the medical diagnostic field black-imaged transparencies are widely used in inspection techniques operating with a light box.

While the present invention will hereinafter be described in connection with a preferred embodiment thereof, it will be understood that it is not intended to limit the invention to that embodiment. On the contrary, it is intended to cover all alternatives, modifications and equivalents as may be included in the spirit and scope of the invention as defined by the appending claims.

The following ingredients in addition to those mentioned above were used in the photothermographic recording materials of the invention examples and comparative examples:

a) antistatic layer ingredients:

KELZAN™ S: a xanthan gum from MERCK & CO., Kelco Division, USA, which according to Technical Bulletin DB-19 is a polysaccharide containing mannose, glucose and glucuronic repeating units as a mixed potassium, sodium and calcium salt;

PT-dispersion: a dispersion of poly(3,4-ethylenedioxy-thiophene)/polystyrene sulphonic acid produced by the polymerization of 3,4-ethylenedioxy-thiophene in the presence of polystyrene sulphonic acid and ferric sulphate as described in U.S. Pat. No. 5,354,613;

ULTRAVON™ W: an aryl sulfonate from CIBA-GEIGY;

PERAPRET™ PE40: a 40% aqueous dispersion of polyethylene wax from BASF;

KIESELSOL™ 100F: a 36% aqueous dispersion of colloidal silica from BAYER;

MAT01: 20% aqueous dispersion of particles of methylmethacrylate(98% by weight)-stearylmethacrylate(2% by weight)-copolymeric beads with an average particle size of 5.9 μm produced as described in U.S. Pat. No. 4,861, 812;

LATEX01: a 12% by weight dispersion of polymethyl methacrylate with an average particle size of 88.8 nm prepared as described in U.S. Pat. No. 5,354,613;

D01:

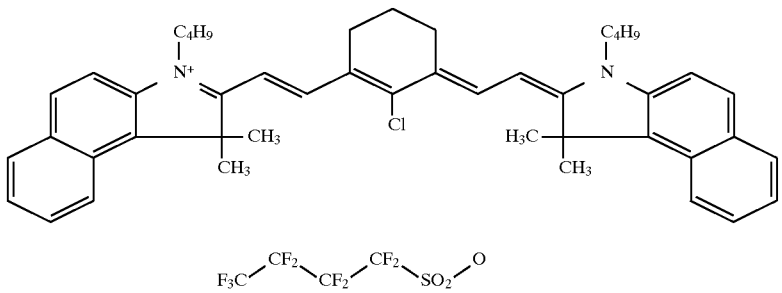

b) photo-addressable thermally developable element ingredients for coating of element from aqueous media:
BINDER 01: copolymer consisting of 45% by weight of methylmethacrylate, 45% by weight of butadiene and 10% by weight of itaconic acid.
SENSI C01 (IR-sensitizing dye according to U.S. Pat. No. 5,441,866):

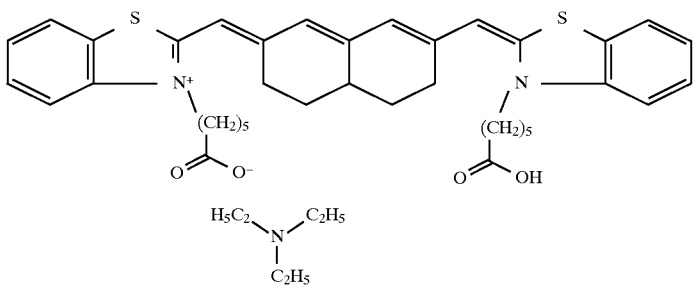

SENSI C02 (IR-sensitizing dye according to EP-A 616 014):

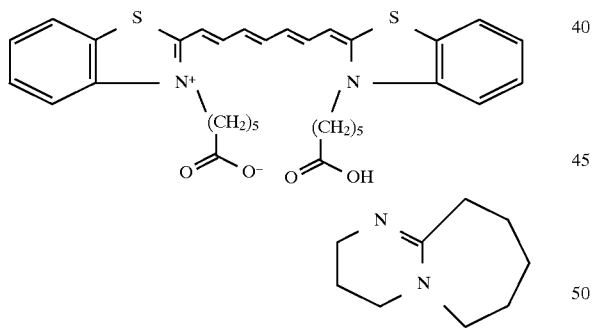

SENSI C03 (IR-sensitizing dye according to EP-A 616 014):

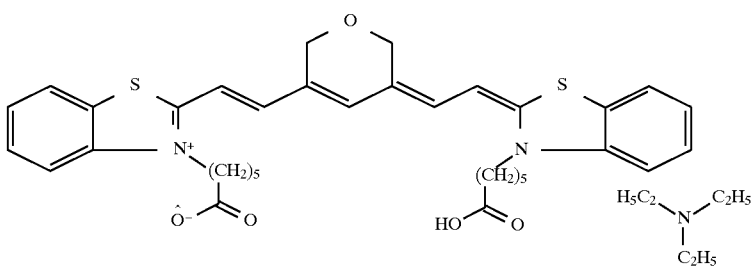

c) photo-addressable thermally developable element ingredients for coating of element from non-aqueous media:

i) silver behenate/silver halide emulsion layer:
GEL: phthaloylgelatin, type 16875 from ROUSSELOT;
Butvar™ B76: polyvinylbutyral from MONSANTO;
LOWINOX™ 22IB46: 2-propyl-bis(2-hydroxy-3,5-dimethylphenyl)methane from CHEM. WERKE LOWI;
TMABP: tetramethylammonium bromide perbromide
PHP: pyridinium hydrobromide perbromide;
TMPS: tribromomethyl benzenesulfinate;
SENSI C01: see above
SENSI C02: see above
SENSI C03: see above ii) protective layer:
CAB: cellulose acetate butyrate, CAB-171-15S from EASTMAN;
PMMA: polymethylmethacrylate, Acryloid™ K120N from ROHM & HAAS.

The following examples and comparative examples illustrate the present invention. The percentages and ratios used in the examples are by weight unless otherwise indicated.

INVENTION EXAMPLE 1

Synthesis of SENSI 01:

The synthesis of SENSI 01 involves the coupling of two intermediates, A and B, which are themselves synthesized from a succession of intermediates in a synthesis ladder.

Synthesis of intermediate A:

The first step in the synthesis of intermediate A was the synthesis of D. D was prepared according to the following reaction scheme:

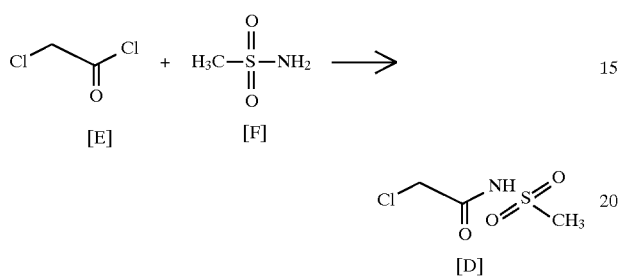

10 L of butylacetate, 2425 g of F en 3038 g of E were added to a flask and the mixture heated to the reflux temperature and then heated for a further 8 hours at the reflux temperature. Upon subsequent cooling to room temperature, the product precipitated out. It was then filtered off and washed with butyl acetate to produce a yield of 74% of intermediate D.

Intermediate A was then synthesized according to the following reaction scheme:

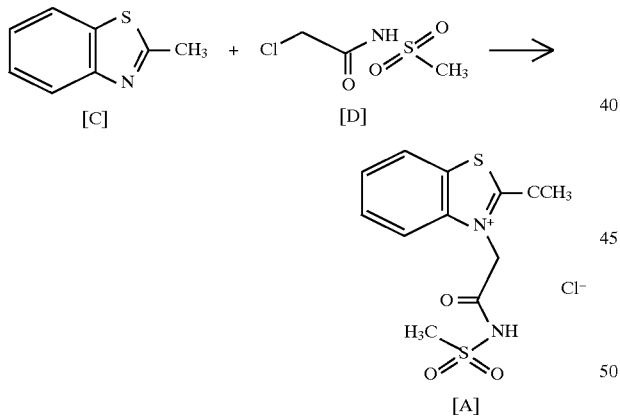

294 g of intermediate D, 343 g of intermediate C and 600 mL of sulfolan was added to a flask and heating with stirring on an oil bath for 24 hours at 125° C. The reaction mixture was then cooled to 60° C. and 1200 mL of acetone added. The resulting suspension was then stirred for 1 hour at room temperature after which it was filtered and thoroughly washed with acetone to produce a 51% yield of intermediate A.

Synthesis of intermediate B:

The first step in the synthesis of intermediate B, was the preparation of intermediate H according to the following synthesis scheme:

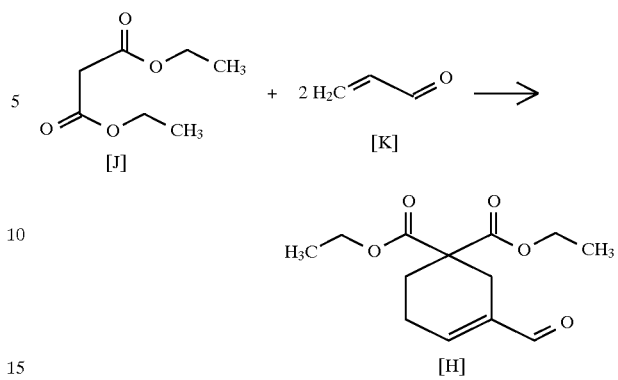

2 L of ethanol, 5.5 g of sodium ethoxide and 759 mL diethyl malonate were added to a flask and the mixture cooled to −30° C. and the atmosphere above the mixture changed to nitrogen. 758 mL of acrolein dissolved in 750 mL of ethanol were then added over a period of 60 hours while maintaining the temperature of the reaction mixture between 0° and 5° C. Upon completion of the acrolein addition the temperature was allowed to rise to room temperature and 8 g of sodium ethoxide dissolved in 180 mL of ethanol was added. After allowing to stand overnight, 19 mL of acetic acid was added and the reaction mixture evaporated under reduced pressure. The liquid residue was then distilled under reduced temperature to produce a 26% yield of intermediate H.

Intermediate H was then used to prepare intermediate G according to the following synthesis scheme:

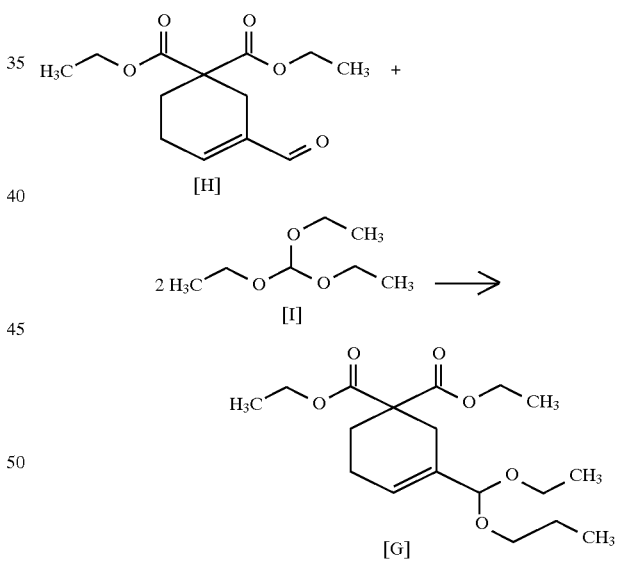

162 g of intermediate H, 162 mL of ethanol and 0.16 g of p-toluenesulfonic acid monohydrate were added to a flask and thoroughly mixed at room temperature. 206 mL of intermediate I were then added with stirring and the stirred reaction mixture then heated to 30° to 40° C. until the reaction was completed. 0.33 mL of a 33% soltion of odium methoxide was then addedand the mixture stirred at 30° to 40° C. for a further 15 minutes. Finally the reaction mixture was vacuum distilled to produce a 99% yield of intermediate G.

Intermediate G was then used to prepare intermediate B according to the following reaction scheme:

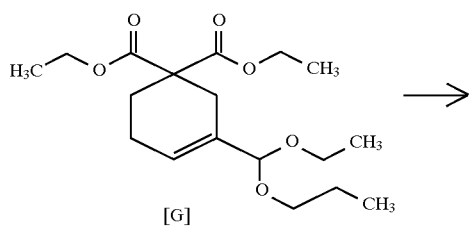

Synthesis of SENSI 01:

SENSI 01 was prepared according to the following reaction scheme:

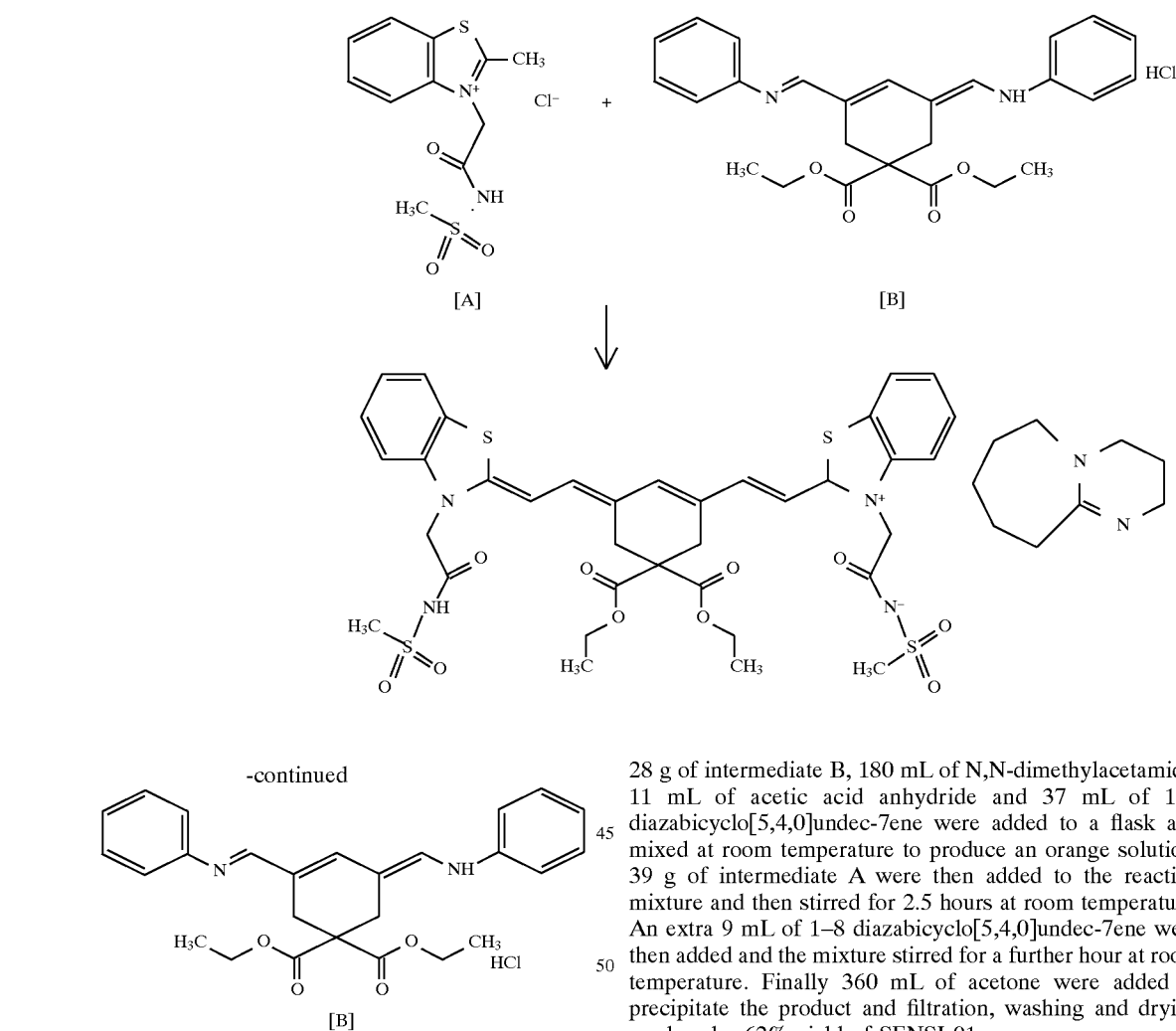

73 mL of dimethylformamide in a flask was cooled to 0° C. 59 mL of phosphoryl chloride were then added with stirring and the mixture stirred for a further hour at room temperature. 98 g of intermediate G were then added with stirring and the mixture stirred for a further 90 minutes at room temperature. 720 mL of ethanol and 33 mL of deionized water were then added and the mixture stirred for a further 30 minutes at room temperature. 273 mL of aniline were then added with stirring and the mixture stirred for a further 30 minutes at room temperature. Finally 3000 mL of a 6N solution of hydrochloric acid was added and the mixture stirred for a further 15 minutes at room temperature. The resulting precipitate was filtered off and washed with a warm mixture of methanol and ethyl acetate to produce an 86% yield of intermediate B.

28 g of intermediate B, 180 mL of N,N-dimethylacetamide, 11 mL of acetic acid anhydride and 37 mL of 1–8 diazabicyclo[5,4,0]undec-7ene were added to a flask and mixed at room temperature to produce an orange solution. 39 g of intermediate A were then added to the reaction mixture and then stirred for 2.5 hours at room temperature. An extra 9 mL of 1–8 diazabicyclo[5,4,0]undec-7ene were then added and the mixture stirred for a further hour at room temperature. Finally 360 mL of acetone were added to precipitate the product and filtration, washing and drying produced a 62% yield of SENSI 01.

INVENTION EXAMPLES 2 TO 10 AND
COMPARATIVE EXAMPLES 1 TO 9

Silver Behenate Dispersion

Silver behenate was prepared by dissolving 34 g (0.1 moles) of behenic acid in 340 mL of 2-propanol at 65° C., converting the behenic acid to sodium behenate by adding 400 mL of 0.25M aqueous sodium hydroxide to the stirred behenic acid solution and finally adding 250 mL of 0.4M aqueous silver nitrate the silver behenate precipitating out. This was filtered off and then washed with a mixture of 10% by volume of 2-propanol and 90% by volume of deionized water to remove residual sodium nitrate.

After drying at 45° C. for 12 h, the silver behenate was dispersed in deionized water with the anionic dispersion agents Ultravon™ W and Mersolat™ H to produce, after rapid mixing using a high speed impingement mill (rotor-stator mixer) to obtain a paste and homogenization with a microfluidizer, a finely divided and stable dispersion containing 20% by weight of silver behenate, 2.1% by weight of Ultravon™ W and 0.203% by weight of Mersolat™ H. The pH of the resulting dispersion was adjusted to about 6.5.

The following ingredients were then added with stirring to 3.0 g of the silver behenate dispersion: 2 g of a 2.22% by weight aqueous solution of 3-(triphenyl-phosphonium) propionic acid bromide (PC02), corresponding to a concentration of 8 mol % of PC02 with respect to silver behenate, at a pH of 4 to accomplish in situ conversion of part of the silver behenate to silver bromide. After 10 minutes further stirring, the supersensitizer was added with stirring as a solution in water and/or methanol, as specified in table 1, immediately followed by the IR-spectral sensitizer as a solution or dispersion in water and/or methanol as specified in table 1. After stirring for a further 15 minutes 2 g of a 30% by weight concentration of an aqueous dispersion of BINDER 01 at a pH of 4 was added with stirring followed by 2 g of a 4.5% by weight aqueous solution of 3-(3',4'-dihydroxyphenyl)propionic acid.

Image-Wise Exposure and Thermal Processing

The photothermographic materials of INVENTION EXAMPLES 2 to 10 and COMPARATIVE EXAMPLES 1 to 9 were exposed to a beam of a 836 nm diode laser type HL 8318G from HITACHI with a nominal power of 12.8 mW focussed to give a spot diameter ($1/e^2$) of 115 μm, scanned at a speed of 5 m/s with a pitch of 63 μm and an overlap of 30% through a wedge filter with optical density varying between 0 and 3.3 in optical density steps of 0.15. The maximum exposure (filter optical density=0) was about $50J/m^2$.

Thermal processing was carried out for 15s with the side of the support not provided with a silver behenate/silver halide emulsion layer in contact with a heated metal block at a temperature of 105° C. The optical densities of the images were measured in transmission with a MacBeth™ TR924 densitometer through a visible filter to produce a sensitometric curve for the photothermographic recording materials from which the maximum and minimum optical densities, $D_{max}$ and $D_{min}$, and the exposure required to obtain an optical density of $D_{min}+0.5$ were determined.

The $D_{max}$- and $D_{min}$-values and the exposure values to obtain an optical density of $D_{min}$30 0.5 obtained upon image-wise exposure and thermal processing of the photothermographic recording materials of INVENTION

TABLE 1

| | IR-sensitizer | | | supersensitizer | | |
|---|---|---|---|---|---|---|
| code | code | Weight of solution [g] | Conc. of solution [% by wt] | code | Weight of solution [g] | Conc. of solution [% by wt] |
| Invention example number | | | | | | |
| 2 | SENSI 01 | 0.190 | 0.05 (MeOH) | — | — | — |
| 3 | SENSI 02 | 0.080 | 0.1 (MeOH) | — | — | — |
| 4 | SENSI 03 | 0.046 | 0.2 (MeOH) | — | — | — |
| 5 | SENSI 04 | 0.046 | 0.3 (MeOH) | — | — | — |
| 6 | SENSI 05 | 0.046 | 0.3 (MeOH) | — | — | — |
| 7 | SENSI 06 | 0.090 | 0.1 ($H_2O$) | — | — | — |
| 8 | SENSI 08 | 0.180 | 0.3 (MeOH) | — | — | — |
| 9 | SENSI 08 | 0.180 | 0.3 (MeOH) | SS-01 | 1.2 | 0.25 (MeOH) |
| 10 | SENSI 09 | 0.051 | 0.3 (MeOH) | — | — | — |
| Comparative example number | | | | | | |
| 1 | SENSI C01 | 0.046 | 0.3 (MeOH) | — | — | — |
| 2 | SENSI C01 | 0.110 | 0.3 (MeOH) | — | — | — |
| 3 | SENSI C01 | 0.180 | 0.3 (MeOH) | — | — | — |
| 4 | SENSI C02 | 0.070 | 0.2 (MeOH) | — | — | — |
| 5 | SENSI C02 | 0.170 | 0.2 (MeOH) | — | — | — |
| 6 | SENSI C02 | 0.270 | 0.2 (MeOH) | — | — | — |
| 7 | SENSI C03 | 0.046 | 0.3 (MeOH) | — | — | — |
| 8 | SENSI C03 | 0.110 | 0.3 (MeOH) | — | — | — |
| 9 | SENSI C03 | 0.180 | 0.3 (MeOH) | — | — | — |

Coating and Drying of the Photothermographic Material

A subbed polyethylene terephthalate support having a thickness 100 μm was doctor blade-coated with the silver behenate/silver bromide dispersion at a blade setting of 90 μm. After drying for several minutes at 40° C. on the coating bed, the emulsion layer was dried for 1 hour in a hot air oven at 40° C.

EXAMPLES 2 to 10 and COMPARATIVE EXAMPLES 1 to 9 together with the IR-sensitizer, supersensitizer, molar ratio of supersensitizer to IR-sensitizer and the thermal processing conditions used are summarized in table 2.

The results in table 2 demonstrate the efficient IR-sensitization of the photothermographic recording materials with the IR-sensitizing dyes of the present invention both with (INVENTION EXAMPLE 9) and without a supersensitizer (INVENTION EXAMPLES 2 to 8 and 10). By comparison SENSI C01, disclosed as an IR-sensitizing dye for photothermographic materials in U.S. Pat. No. 5,441,866, and SENSI C02 and SENSI C03, disclosed as IR-sensitizing dyes in EP-A 616 014, exhibit no IR-sensitization in the absence of supersensitizer in the exposure range investigated.

74.3 mL of deionized water and then adding with stirring: 0.2 mL of 25% $NH_4OH$, 0.6 g of dried PT-dispersion, 66.7 mL of LATEX01 after adsorption of D01, 1.2 mL of MAT01 and 30 mL of 2-propanol to produce a layer after drying at 120° C. consisting of:
KELZAN™ S: 7.5 mg/m$^2$
Dried PT-dispersion: 15 mg/m$^2$

TABLE 2

| | IR-sensitizer code | super-sensitizer code | moles super-sensitizer/ mol IR-sensitizer | thermal processing conditions temperature [°C.] | time [s] | $D_{max}$ (exposure of 50 J/m$^2$) | $D_{min}$ | exposure to obtain $D_{min}$ + 0.5 [J/m$^2$] |
|---|---|---|---|---|---|---|---|---|
| Invention example number | | | | | | | | |
| 2 | SENSI 01 | — | — | 105 | 15 | 1.56 | 0.20 | 2.7 |
| 3 | SENSI 02 | — | — | 105 | 15 | 1.22 | 0.21 | 10.2 |
| 4 | SENSI 03 | — | — | 105 | 15 | 1.95 | 0.28 | 0.48 |
| 5 | SENSI 04 | — | — | 105 | 15 | 1.08 | 0.18 | 11 |
| 6 | SENSI 05 | — | — | 105 | 15 | 0.68 | 0.19 | 49 |
| 7 | SENSI 06 | — | — | 105 | 15 | 1.74 | 0.17 | 3.7 |
| 8 | SENSI 08 | — | — | 105 | 15 | 1.10 | 0.38 | 29.6 |
| 9 | SENSI 08 | SS-01 | 5:1 | 105 | 15 | 1.42 | 0.36 | 5.8 |
| 10 | SENSI 09 | — | — | 105 | 15 | 1.25 | 0.16 | 7.0 |
| Comparative example number | | | | | | | | |
| 1 | SENSI C01 | — | — | 105 | 15 | 0.21 | 0.21 | >>50 |
| 2 | SENSI C01 | — | — | 105 | 15 | 0.21 | 0.21 | >>50 |
| 3 | SENSI C01 | — | — | 105 | 15 | 0.20 | 0.20 | >>50 |
| 4 | SENSI C02 | — | — | 105 | 15 | 0.21 | 0.21 | >>50 |
| 5 | SENSI C02 | — | — | 105 | 15 | 0.24 | 0.24 | >>50 |
| 6 | SENSI C02 | — | — | 105 | 15 | 0.25 | 0.25 | >>50 |
| 7 | SENSI C03 | — | — | 105 | 15 | 0.14 | 0.14 | >>50 |
| 8 | SENSI C03 | — | — | 105 | 15 | 0.22 | 0.16 | >>50 |
| 9 | SENSI C03 | — | — | 105 | 15 | 0.21 | 0.21 | >>50 |

INVENTION EXAMPLES 11 TO 17

Support

A polyethyleneterephthalate (PET) foil was first coated on both sides with a subbing layer consisting of a terpolymer latex of vinylidene chloride-methyl acrylate-itaconic acid (88/10/2) in admixture with colloidal silica (surface area 100 m$^2$/g). After stretching the foil in the transverse direction the foil had a thickness of 175 μm with coverages of the terpolymer and of the silica in the subbing layers of 170 mg/m$^2$ and 40 mg/m$^2$ respectively on each side of the PET-foil.

Antihalation/Antistatic Layer

The antihalation/antistatic layers of the photothermographic recording materials of INVENTION EXAMPLES 11 to 17 were prepared by first adsorbing antihalation dye D01 onto the polymethyl methacrylate particles of LATEX01 by adding 55 mg of D01 dissolved in ethyl acetate/g polymethyl methacrylate and then evaporating off the ethyl acetate.

One side of the thus subbed PET-foil was then coated with an antistatic composition consisting obtained by dissolving 0.30 g of KELZAN™ S in a stirred mixture of 22.4 mL of N-methylpyrrolidone, 0.84 g of ULTRAVON™ W, 1 g of PERAPRET™ PE40 and 2.22 g of KIESELSOL 100F in ULTRAVON™ W: 21 mg/m$^2$
polyethylene wax (from PERAPRET™ PE40): 10 mg/m$^2$
colloidal silica (from KIESELSOL™ 100F): 20 mg/m$^2$
5.9 μm beads of crosslinked methylmethacrylate-stearylmethacrylate copolymer (from MAT01): 6 mg/m$^2$
polymethylmethacrylate (from LATEX01): 200 mg/m$^2$
Antihalation dye D01: 11 mg/m$^2$ Silver Halide Emulsion A silver halide emulsion consisting of 3.11% by weight of silver halide particles consisting of 97 mol % silver bromide and 3 mol % silver iodide with an weight average particle size of 50 nm, 0.47% by weight of GEL as dispersing agent in deionized water was prepared using conventional silver halide preparation techniques such as described, for example, in T. H. James, "The Theory of the Photographic Process", Fourth Edition, Macmillan Publishing Co. Inc., New York (1977), Chapter 3, pages 88–104.

Silver Behenate/Silver Halide Emulsion

The silver behenate/silver halide emulsion was prepared by adding a solution of 6.8 kg of behenic acid in 67 L of 2-propanol at 65° C. to a 400 L vessel heated to maintain the temperature of the contents at 65° C., converting 96% of the behenic acid to sodium behenate by adding with stirring 76.8 L of 0.25M sodium hydroxide in deionized water, then adding with stirring 10.5 kg of the above-described silver halide emulsion at 40° C. and finally adding with stirring 48 L of a 0.4M solution of silver nitrate in deionized water. Upon completion of the addition of silver nitrate the contents of the vessel were allowed to cool and the precipitate filtered off, washed, slurried with water, filtered again and finally dried at 400° C. for 72 hours.

7 kg of the dried powder containing 9 mol % silver halide and 4 mol % behenic acid with respect to silver behenate were then dispersed in a solution of 700 g of Butvar™ B76 in 15.6 kg of 2-butanone using conventional dispersion techniques yielding a 33% by weight dispersion. 7.4 kg of 2-butanone were then added and the resulting dispersion homogenized in a microfluidizer. Finally 2.8 kg of Butvar™ B76 were added with stirring to produce a dispersion with 31% by weight of solids.

Coating and Drying of Silver Behenate/Silver Halide Emulsion Layer

The emulsion layer coating compositions for the photothermographic recording materials of INVENTION EXAMPLES 11 to 17 were prepared by adding the following solutions or liquids to 40.86 g of the above-mentioned silver behenate/silver halide emulsion in the following sequence with stirring: 10.87 g of 2-butanone, 0.75 g of a 9% solution of TMABP in methanol followed by 2 hours stirring, 1.3 g of 2-butanone, 0.2 g of a 11%, solution of calcium bromide in methanol and 1.3 g of 2-butanone followed by 30 minutes stirring and a solution consisting of 0.21 g of LOWINOX™ 22IB46, 0.5 g of TMPS and 9.24 g of 2-butanone followed by 10 minutes stirring. A particular weight of a particular IR-sensitizing dye solution of a particular concentration which may also contain a particular supersensitizer at a particular concentration, as specified for the particular INVENTION EXAMPLE in table 3, was then added followed by 30 minutes stirring. Finally 4.35 g of Butvar™ B76 were added followed by 45 minutes of stirring and then 2-butanone to make the total weight up to 76 g.

The PET-foil subbed and coated with an antistatic layer as described above was then doctor blade-coated at a blade setting of 150 μm on the side of the foil not coated with an antistatic layer with the coating composition to a wet layer thickness of 80 μm, which was dried for 5 minutes at 80° C. on an aluminium plate in a drying cupboard.

Protective Layer

A protective layer coating composition for the photothermographic recording materials of INVENTION EXAMPLES 11 to 17 was prepared by dissolving 4.08 g of CAB and 0.16 g of PMMA in 36.3 g of 2-butanone and 4.16 g of methanol adding the following solids or solution with stirring in the following sequence: 0.5 g of phthalazine, 0.2 g of 4-methylphthalic acid, 0.1 g of tetrachlorophthalic acid, 0.2 g of tetrachlorophthalic acid anhydride and a solution consisting of 2.55 g of LOWINOX™ 22IB46 and 5.95 g 2-butanone.

The emulsion layer was then doctor blade-coated at a blade setting of 100 μm with the protective layer coating composition to a wet layer thickness of 57 μm, which after drying for 8 minutes at 80° C. on an aluminium plate in a drying cupboard produced a layer with the following composition:

CAB 4.08 g/m$^2$
PMMA 0.16 g/m$^2$
Phthalazine 0.50 g/m$^2$
4-methylphthalic acid 0.20 g/m$^2$
tetrachlorophthalic acid 0.10 g/m$^2$
tetrachlorophthalic acid anhydride 0.20 g/m$^2$
LOWINOX™ 22 IB46 2.55 g/m$^2$

Image-Wise Exposure and Thermal Processing

The photothermographic recording materials of INVENTION EXAMPLES 11 to 17 were exposed to a 849 nm single mode diode laser beam from SPECTRA DIODE LABS with a nominal power of 100 mW of which 61 mW actually reached the recording material focussed to give a spot diameter ($1/e^2$) of 28 μm, scanned at speed of 50 m/s with a pitch of 14 μm through a wedge filter with optical density varying between 0 and 4.2 in optical density steps of 0.20.

Thermal processing was carried out for 10s or 14s with the side of the support provided with a silver behenate/silver halide emulsion layer in contact with a drum heated to a temperature of 121° C., as specified in table 4. The optical densities of the images were measured in transmission with a MacBeth™ TR924 densitometer through a visible filter to produce a sensitometric curve for the photothermographic recording materials from which the maximum and minimum optical densities, $D_{max}$ and $D_{min}$, and the exposure required to obtain an optical density of $D_{min}+1.0$ were determined.

The $D_{max}$- and $D_{min}$-values and the exposure values to obtain an optical density of $D_{min}+1.0$ obtained upon image-wise exposure and thermal processing of the photothermographic recording materials of INVENTION EXAMPLES 11 to 17 together with the IR-sensitizer, supersensitizer,

TABLE 3

| | | IR-sensitizer | | | supersensitizer | | |
|---|---|---|---|---|---|---|---|
| Invention example number | code | Weight of solution [g] | Conc. of solution [% by wt] | mmol/mol AgX | code | Weight of solution [g] | Conc. of solution [% by wt] |
| 11 | SENSI 01 | 1.84 | 0.108 | 1.15 | — | — | — |
| 12 | SENSI 03 | 1.36 | 0.074 | 1.0 | — | — | — |
| 13 | SENSI 03 | 1.36 | 0.072 | 1.0 | SS-02 | * | 1.66 |
| 14 | SENSI 03 | 2.04 | 0.098 | 1.5 | — | — | — |
| 15 | SENSI 05 | 2.00 | 0.1 | 1.5 | — | — | — |
| 16 | SENSI 10 | 1.76 | 0.1 | 1.5 | — | — | — |
| 17 | SENSI 11 | 1.50 | 0.1 | 1.5 | — | — | — |

*supersensitizer present in the solution of the IR-sensitizer molar ratio of supersensitizer to IR-sensitizer and the thermal processing conditions used are summarized in table 4.

It is evident from the results in table 4, that spectral sensitization of photothermographic recording materials with IR-sensitizing dyes, according to the present invention, results in efficient spectral sensitization in the infra-red region of the spectrum. In the case of spectral sensitization with SENSI 03, the presence of the supersensitizer SS-02 markedly reduces the $D_{min}$-value obtained, but at the expense of a reduced sensitivity (=increased exposure needed to obtain an optical density of $D_{min}$+1.0).

the particular INVENTION EXAMPLE in table 5, was then added followed by 30 minutes stirring. 2.4 g of LOWI-NOX™ 22IB46 and 0.5 g of TMPS were then added followed by 3.24 g of 2-butanone to make the total weight up to 81 g.

The PET-foil subbed and coated with an antistatic layer as described above was then doctor blade-coated at a blade setting of 150 μm on the side of the foil not coated with an antistatic layer with the coating composition to a wet layer thickness of 85 μm, which was dried for 5 minutes at 80° C. on an aluminium plate in a drying cupboard.

TABLE 4

| Invention example number | IR-sensitizer code | super-sensitizer code | moles super-sensitizer/ mol IR-sensitizer | thermal processing conditions temperature [°C.] | time [s] | $D_{max}$ (exposure of 87 J/m²) | $D_{min}$ | exposure to obtain $D_{min}$ + 1.0 [J/m²] |
|---|---|---|---|---|---|---|---|---|
| 11 | SENSI 01 | — | — | 121 | 10 | 3.67 | 0.20 | 0.66 |
| 12 | SENSI 03 | — | — | 121 | 10 | 3.80 | 0.59 | 0.66 |
| 13 | SENSI 03 | SS-02 | 95:1 | 121 | 10 | 3.19 | 0.21 | 2.69 |
| 14 | SENSI 03 | — | — | 121 | 10 | 1.94 | 0.21 | 6.71 |
| 15 | SENSI 05 | — | — | 121 | 10 | 3.65 | 0.28 | 0.41 |
| 16 | SENSI 10 | — | — | 121 | 10 | 2.60 | 0.17 | 4.26 |
| 17 | SENSI 11 | — | — | 121 | 10 | 3.16 | 0.34 | 2.69 |

INVENTION EXAMPLES 18 TO 20

Silver Behenate/Silver Halide Emulsion 7 kg of dried powder containing 9 mol % silver halide and 4 mol % behenic acid produced as described for INVENTION EXAMPLES 11 to 17 were dispersed in a solution of 648 g of Butvar™ B79 in 29.9 kg of 2-butanone using a microfluidizer yielding a dispersion with 20% by weight of solids. 6.5 kg of Butvar™ B79 were then added to produce a dispersion with 32% by weight of solids.

Coating and Drying of Silver Behenate/Silver Halide Emulsion Layer

An emulsion layer coating composition for the photothermographic recording materials of INVENTION EXAMPLES 18 to 20 was prepared by adding the following solutions or liquids to 53.61 g of the above-mentioned silver behenate/silver halide emulsion in the following sequence with stirring: 10 g of 2-butanone, 0.8 g of a 11.5% solution of PHP in methanol followed by 2 hours stirring, 1 g of 2-butanone and 0.2 g of a 11% solution of calcium bromide in methanol followed by 30 minutes stirring. A particular weight of a particular IR-sensitizing dye solution of a particular concentration which may also contain a particular supersensitizer at a particular concentration, as specified for

TABLE 5

| | | IR-sensitizer | | | supersensitizer | | |
|---|---|---|---|---|---|---|---|
| Invention example number | code | Weight of solution [g] | Conc. of solution [% by wt] | mmol/ mol AgX | code | Weight of solution [g] | Conc. of solution [% by wt] |
| 18 | SENSI 02 | 10 | 0.02 | 1.5 | — | — | — |
| 19 | SENSI 02 | 10 | 0.02 | 1.5 | SS-02 | * | 0.34 |
| 20 | SENSI 07 | 10 | 0.02 | 1.5 | — | — | — |

*supersensitizer present in the solution of the IR-sensitizer

Protective Layer

A protective layer coating composition for the photothermographic recording materials of INVENTION EXAMPLES 18 to 20 was prepared by dissolving 4.08 g of CAB and 0.16 g of PMMA in 47 g of 2-butanone and 4.4 g of methanol adding the following solids with stirring in the following sequence: 0.5 g of phthalazine, 0.2 g of 4-methylphthalic acid, 0.1 g of tetrachlorophthalic acid and 0.2 g of tetrachlorophthalic acid anhydride.

The emulsion layer was then doctor blade-coated at a blade setting of 100 μm with the protective layer coating composition to a wet layer thickness of 60 μm, which after drying for 8 minutes at 80° C. on an aluminium plate in a drying cupboard produced a layer with the following composition:

CAB 4.08 g/m²
PMMA 0.16 g/m²
Phthalazine 0.50 g/m²
4-methylphthalic acid 0.20 g/m²
tetrachlorophthalic acid 0.10 g/m²
tetrachlorophthalic acid anhydride 0.20 g/m²

Image-Wise Exposure and Thermal Processing

The photothermographic recording materials of INVENTION EXAMPLES 18 to 20 were exposed to a 830 nm single mode diode laser beam from SPECTRA DIODE LABS with a nominal power of 150 mW focussed to give a spot diameter ($1/e^2$) of 10 µm, scanned at speed of 8.8 m/s with a pitch of 5.9 µm through a filter with optical density varying between 0 and 4.2 in optical density steps of 0.15.

Thermal processing and the evaluation of the resulting wedge images to determine the exposure required to obtain an optical density of $D_{min}+1.0$ and the $D_{max}$- and $D_{min}$-values were carried out as described for the photothermographic recording materials of INVENTION EXAMPLES 11 to 17.

The $D_{max}$- and $D_{min}$-values and the exposures required to obtain an optical density of $D_{min}+1.0$ obtained upon image-wise exposure and thermal processing of the photothermographic recording materials of INVENTION EXAMPLES 18 to 20 together with the IR-sensitizer, supersensitizer, molar ratio of supersensitizer to IR-sensitizer and the thermal processing conditions used are summarized in table 6.

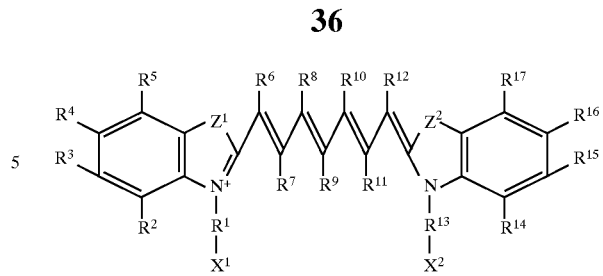

with an anion if necessary for charge compensation, wherein $Z^1$ and $Z^2$ independently represent S, O or Se; $R^1$ and $R^{13}$ independently represent an alkylene group; $X^1$ and $X^2$ independently represent a —(C=O)—$R^{18}$, a —(SO$_2$)—$R^{19}$ or a —(S=O)—$R^{20}$ group where $R^{18}$, $R^{19}$ and $R^{20}$ independently represent an alkoxy-, aryloxy- or amino-group; $R^2$, $R^3$, $R^4$, $R^5$, $R^{14}$, $R^{15}$, $R^{16}$ and $R^{17}$ independently represent hydrogen, chlorine, bromine, fluorine, iodine or a keto-, sulfo-, carboxy-, ester-, sulfonamide-, amide-, dialkylamino-, nitro-, cyano-, alkyl-, alkenyl-, heteroaromatic, aryl-, alkoxy- or aryloxy-group; or each of $R^2$ together with $R^3$, $R^3$ together with $R^4$, $R^4$ together with $R^5$, $R^{14}$ together with $R^{15}$, $R^{15}$ together with $R^{16}$ and $R^{16}$ together with $R^{17}$ may independently constitute the atoms necessary to complete a benzene ring; $R^6$, $R^7$, $R^8$, $R^9$, $R^{10}$, $R^{11}$ and $R^{12}$ independently represent hydrogen, chlorine, bromine, fluorine, iodine, an alkyl group, an alkoxy group, an aryloxy group, a thioalkyl group, a disubstituted amino group, where the substituents may constitute the atoms necessary to complete a 5-ring atom or 6-ring atom hetero-

TABLE 6

| Invention example number | IR-sensitizer code | super-sensitizer code | moles super-sensitizer/ mol IR-sensitizer | thermal processing conditions temperature [°C.] | time [s] | $D_{max}$ (exposure of 224 J/m²) | $D_{min}$ | exposure to obtain $D_{min} + 1.0$ [J/m²] |
|---|---|---|---|---|---|---|---|---|
| 18 | SENSI 02 | — | — | 121 | 14 | 3.89 | 1.65 | 1.32 |
| 19 | SENSI 02 | SS-02 | 95:1 | 121 | 14 | 3.71 | 0.17 | 13.31 |
| 20 | SENSI 07 | — | — | 121 | 14 | 3.75 | 0.14 | 5.25 |

It is evident from the results in table 6, that spectral sensitization of photothermographic recording materials with IR-sensitizing dyes, according to the present invention, results in efficient spectral sensitization in the infra-red region of the spectrum. In the case of sensitization with SENSI 02, the presence of the supersensitizer SS-02 is seen strongly to reduce the $D_{min}$-value but with a considerable loss in sensitivity (=increase in exposure needed to obtain an optical density of $D_{min}+1$).

Having described in detail preferred embodiments of the current invention, it will now be apparent to those skilled in the art that numerous modifications can be made therein without departing from the scope of the invention as defined in the following claims.

We claim:

1. A photothermographic recording material comprising a support and a photo-addressable thermally developable element comprising a substantially light-insensitive organic silver salt, a reducing agent therefor in thermal working relationship therewith, photosensitive silver halide spectrally sensitized with a dye and in catalytic association with said substantially light-insensitive organic silver salt and a binder, wherein said dye represented by the formula (I):

cyclic ring, or each of $R^6$ together with $R^8$, $R^8$ together with $R^{10}$, $R^{10}$ together with $R^{12}$, $R^7$ together with $R^9$ and $R^9$ together with $R^{11}$ may independently constitute the atoms necessary to complete a 5-atom or 6-atom carbocyclic or heterocyclic ring; and each of $R^1$ together with $R^6$ and $R^{13}$ together with $R^{12}$ may independently constitute the atoms necessary to complete a 5-ring atom or 6-ring atom heterocyclic ring.

2. The photothermographic recording material according to claim 1, wherein said dye corresponds to formula (I) wherein $R^{18}$, $R^{19}$ and $R^{20}$ independently represent a —NH—(C=O)—$R^{21}$, —NH—(SO$_2$)—$R^{22}$, —NH—(S=O)—$R^{23}$ or a —NH—CN group which may be deprotonated, where $R^{21}$, $R^{22}$ and $R^{23}$ independently represent an alkyl or aryl group.

3. The photothermographic recording material according to claim 1, wherein said dye is present as an amine salt.

4. The photothermographic recording material according to claim 1, wherein said dye corresponds to the formula

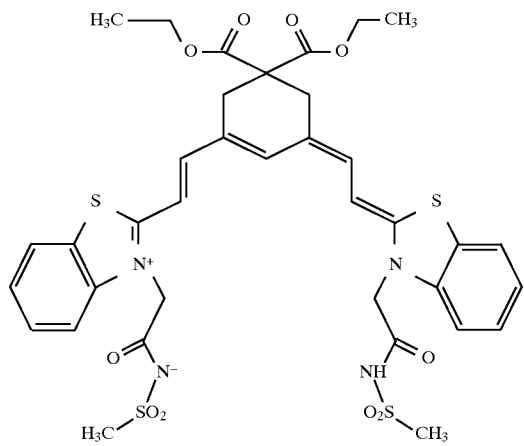

5. The photothermographic recording material according to claim 1, wherein said dye corresponds to the formula

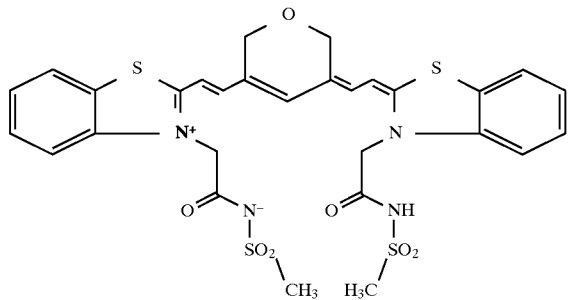

6. The photothermographic recording material according to claim 1, wherein said dye corresponds to the formula

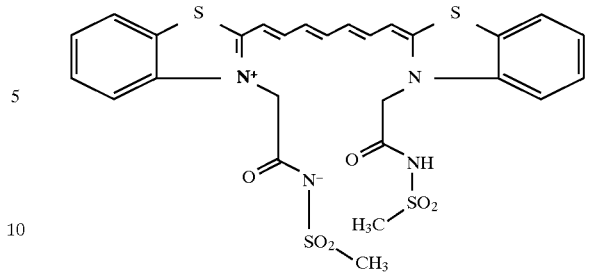

7. The photothermographic recording material according to claim 1, wherein said dye corresponds to the formula

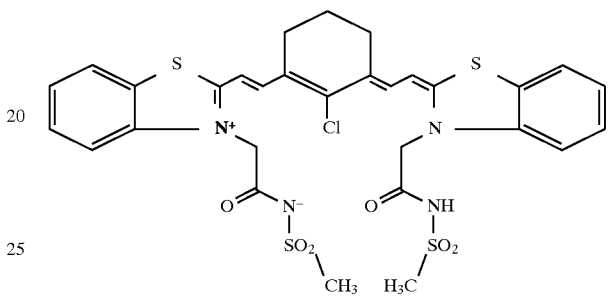

8. The photothermographic recording material according to claim 1, wherein said photo-addressable element further comprises a supersensitizer.

9. The photothermographic recording material according to claim 1, wherein said substantially light-insensitive organic silver salt is a silver salt of an aliphatic carboxylic acid.

10. The photothermographic recording material according to claim 1, wherein said photo-addressable element is provided with a protective layer.

11. The photothermographic recording material according claim 1, wherein said binder comprises a water-soluble binder, a water-dispersible binder or a mixture of a water-soluble and a water-dispersible binder.

* * * * *

UNITED STATES PATENT AND TRADEMARK OFFICE
CERTIFICATE OF CORRECTION

PATENT NO. : 5,876,915

DATED : March 2, 1999

INVENTOR(S) : Deroover et al.

It is certified that error appears in the above-identified patent and that said Letters Patent is hereby corrected as shown below:

Column 1, line 6, "Sep. 26, 1996" should read -- Dec. 13, 1996 --;

Column 12, line 3, "are:" should read -- are: ¶SS-01: -- ;

Col. 26, formula (product of [A] + [B]): "  " should read --  --.

Signed and Sealed this

Twenty-fifth Day of July, 2000

*Attest:*

*Attesting Officer*

Q. TODD DICKINSON

*Director of Patents and Trademarks*